United States Patent
Jansz et al.

(10) Patent No.: US 11,055,484 B1
(45) Date of Patent: Jul. 6, 2021

(54) EDIT CONTROL FOR ELECTRONIC DOCUMENTS EDITED IN AN UNCONSTRAINED MANNER

(71) Applicant: Coupa Software Incorporated, San Mateo, CA (US)

(72) Inventors: Kevin N. Jansz, Melbourne (AU); Justin M. Lipton, Melbourne (AU); Jamie Wodetzki, Boston, MA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 16/858,453

(22) Filed: Apr. 24, 2020

(51) Int. Cl.
 G06F 17/00 (2019.01)
 G06F 40/186 (2020.01)
 G06F 40/106 (2020.01)
 G06F 16/93 (2019.01)

(52) U.S. Cl.
 CPC ............ *G06F 40/186* (2020.01); *G06F 16/93* (2019.01); *G06F 40/106* (2020.01)

(58) Field of Classification Search
 CPC ......... G06F 40/186; G06F 3/93; G06F 40/106
 See application file for complete search history.

(56) References Cited

U.S. PATENT DOCUMENTS

| | | | | |
|---|---|---|---|---|
| 2007/0101259 | A1* | 5/2007 | Grigoriadis | G06F 40/186 715/205 |
| 2015/0046791 | A1* | 2/2015 | Isaacson | G06F 40/103 715/234 |
| 2017/0017646 | A1* | 1/2017 | Kumar | G06Q 10/10 |
| 2017/0116179 | A1* | 4/2017 | Gagne-Langevin | G06F 40/226 |
| 2017/0351655 | A1* | 12/2017 | Zheng | G06F 40/143 |
| 2018/0239959 | A1* | 8/2018 | Bui | G06F 40/103 |
| 2018/0268506 | A1 | 9/2018 | Wodetzki et al. | |
| 2020/0327151 | A1* | 10/2020 | Coquard | G06F 40/56 |
| 2020/0327172 | A1* | 10/2020 | Coquard | G06F 16/906 |
| 2020/0410617 | A1* | 12/2020 | Wichern | G06Q 10/103 |

OTHER PUBLICATIONS

Minakov et al., "Creating Contract Templates for Car Insurance Using Multi-agent Based Text Understanding and Clustering", Springer-Verlag Berlin Heidelberg dated 2007, 2 pages.

Koga et al., "Content Control Scheme to Realize Right Succession and Edit Control", In Proceedings of the 12th International Conference on e-Business (ICE-B-2015), dated 2015, 8 pages.

https://link.springer.com/, "Creating Contract Templates for Car Insurance Using Multi-agent Based Text Understanding and Clustering", HoloMAS 2007: Holonic, Multi-Agent Systems for Manufacturing, 7 pages.

Gómez, et al., "A Framework for Variable Content Document Generation with Multiple Actors", https://hal.inria.fr/hal-00965542, dated Dec. 10, 2013, 52 pages.

* cited by examiner

Primary Examiner — Barbara M Level
(74) Attorney, Agent, or Firm — Baker Botts L.L.P.

(57) ABSTRACT

Embodiments of the disclosed technologies are capable of detecting an edit in an edited document, mapping the edit to stored structured data, executing stored logic associated with the stored structured data to alter a stored template and/or alter the stored structured data and/or insert a candidate edit from a stored set of candidate edits into a reference document.

14 Claims, 9 Drawing Sheets

FIG. 4B

EDIT CONTROL FOR ELECTRONIC DOCUMENTS EDITED IN AN UNCONSTRAINED MANNER

TECHNICAL FIELD

One technical field to which this disclosure relates is computer software for automated electronic document generation. Another technical field to which this disclosure relates is text editing software, including word processors. Yet another technical field to which this disclosure relates is computer software for adding metadata to documents.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020 Coupa Software, Inc.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

Document generation software can create a document by an automated process that merges a text-based format with a set of data. With document generation software, the software is the "author" of documents created through the use of that software.

Text editing software is designed to produce a document as a result of interactions of one or more users with the text editing software via one or more input devices. A document created by text editing software has at least one human author. Examples of text editing software include word processing applications and message composition applications such as email, instant messaging, and social media platforms.

Text editing software may include a "redline" or "comparison" feature, which causes differences between the unstructured text of two documents, or differences between portions of the unstructured text contained in two versions of the same document, to be visually highlighted on a graphical user interface.

SUMMARY

The appended claims may serve as a summary of the present invention.

BRIEF DESCRIPTION OF THE DRAWINGS

FIG. 4A, FIG. 4B, FIG. 4C, and FIG. 4D are example screen captures of displays on computer display devices that may be implemented in at least one embodiment of the computing system of FIG. 1.

Figure 1A:
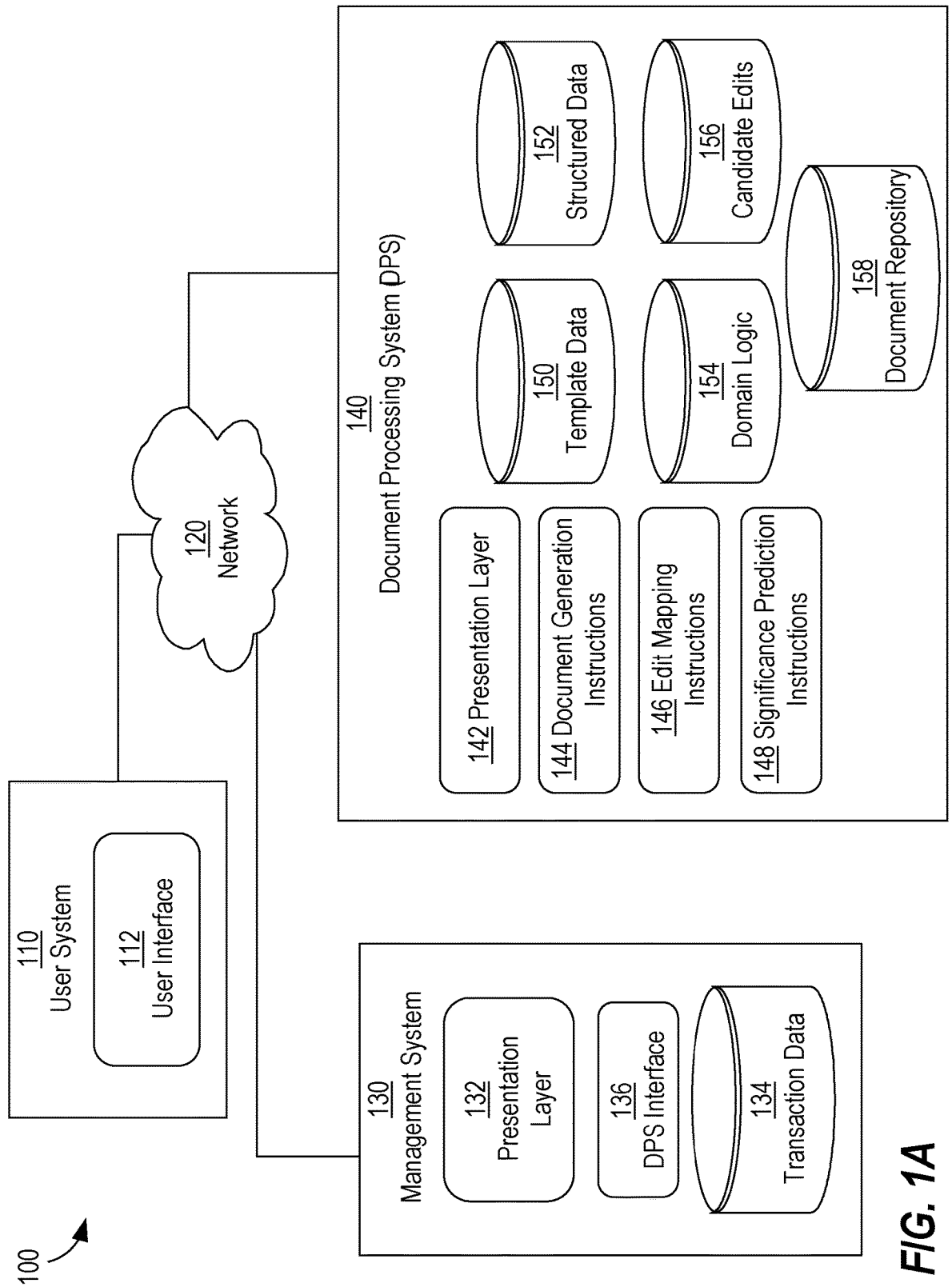
FIG. 1A is a block diagram illustrating at least one embodiment of a computing system in which aspects of the present disclosure may be implemented.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

Overview

1. Technical Problem

Redline or "compare" functionality of text editing software indicates differences in the unstructured text of two different documents, but does not provide any information about the significance of those text-based differences. For example, visually highlighting a textual difference between two documents does not in itself indicate whether the difference is substantive or non-substantive, important or unimportant, high risk or low risk, one that can be accepted without further consideration or one that requires additional review. Further, if the difference is substantive, risky, or otherwise important, mere redlining does not provide any information about the substantive impact of an edit on other sections the document away from the changed text or its impact on the document as a whole.

This shortcoming of existing document comparison functionality is especially acute when a document is initially created by document generation software and subsequently edited, perhaps multiple times, in an unconstrained manner by text editing software.

2. Technical Challenges

The technical problem outlined above has raised specific technical challenges for distributed computer systems, data processing, and software engineering. It has been a technical challenge for computer software to correctly map edits made in the unstructured text of a document to corresponding structured data. For example, when a "reference" document is created by document generation software, the document generation software also creates and stores a "master" set of structured data that is associated with the reference document. The master set of structured data often includes data values that may have varying degrees of importance to the overall meaning and/or risk level associated with the reference document.

While a reference document may have been created by document generation software, downstream versions of the reference document are created externally to the document generation software, perhaps by multiple different entities, perhaps in an unconstrained manner. Unconstrained as used herein may refer to an editing process that is not guided or limited by any business logic or domain rules.

For example, a copy of the reference document may be sent by email, or uploaded to a cloud-based storage service or file sharing service, or stored in collaboration software, or otherwise digitally shared with another entity. An entity having access to the shared document typically make any edits that the entity deems appropriate to the unstructured text of the document, using text editing software such as a word processor. While edits may be made dynamically to the document text, the structured data associated with the reference document upon its initial creation by the document generation software remains static. This creates a mismatch between the structured data associated with the reference document and the actual unstructured text contents of the downstream version of the reference document.

3. Technical Solutions that Address Technical Challenges

Embodiments of the disclosed technologies are structured and programmed to utilize a stored template to produce a mapping of text-based edits made in an edited document to structured data associated with a reference version of the edited document. Embodiments can use the mapping to predict the significance of certain text-based edits. Embodiments can execute logic associated with the structured data via the stored template. Execution of such logic may alter the normal processing of the document based on a predicted significance of a particular text-based edit. For example, low significance edits may not alter the normal processing of the document, but high significance edits may alter the normal processing flow of the document. For instance, a high significance edit may trigger an additional round of digital review or approval of the document.

As explained in more detail below, whether an edit is predicted to have a high or low significance may depend upon a measure of similarity between the edit and the structured data and/or a set of domain-specific factors. An example of an edit that may be predicted to have low significance is a grammatical error correction. As a result, the grammatical error correction may be routinely or automatically accepted without altering the normal redline-style processing of the document.

On the other hand, an example of an edit that may be predicted to have high significance is a change to a dollar amount in a contract. As a result of a high significance edit, normal processing of the document may be altered to bring the edit to the attention of a user, to request user validation of the edit, to recommend additional text to be inserted into the document in response to the edit, or to take some other action that alters the normal process of accepting and rejecting text-based changes.

In some embodiments, when a portion of a document that has been identified as risky during the document generation process is manually modified downstream using text editing software, the system uses the risk information associated with the modified portion to determine whether that modification is likely to be impactful. To do this, the system may traverse a rule such as, "if an edit is made to the Limitation of Liability section of a contract document, set risk to high" or "if an edit is made to the Party Names section of a contract document, set risk to low."

4. Benefits

The disclosed technologies improve upon existing document redlining and comparison functionality. For example, the disclosed technologies can provide "intelligent" redlining and comparison functionality by automatically predicting a significance of an edit and conditioning the execution of logic on the predicted significance of the text-based edits. If the predicted significance of an edit does not satisfy a significance criterion, logic altering the normal processing of the document is not executed. If the predicted significance of an edit satisfies a significance criterion, logic altering the normal processing of the document is executed.

Execution of logic may, for example, flag a specific subset of all of the text-based edits for special review by a human user and/or control the type or extent of edits that may be made to both the structured data and the reference document. For instance, execution of the logic may constrain the edits to a finite set of candidate edits, thereby adding "virtual guardrails" to the document editing process. A set of candidate edits may include, for example, canonical samples of text that may be inserted into the document as new additions or as alternatives to replace the existing text. In some embodiments, the system will detect that certain edits do not make sense, such as that a data value like party name has been changed in one section of the document (Recitals, for example) but not in another section of the same document (Execution Block, for example), and generate appropriate notifications.

System Overview

FIG. 1 illustrates a computing system in which embodiments of the features described in this document can be implemented. In the embodiment of FIG. 1, computing system 100 includes a user system 110, a management system 130, and a document processing system (DPS) 140.

User system 110 includes at least one computing device, such as a personal computing device, a server, a mobile computing device, or a smart appliance. User system 110 includes at least one software application, including a user interface 112. For example, user interface 112 may be or include front-end portions of document generation software and/or text editing software and/or management system 130 and/or DPS 140.

In an embodiment, user interface 112 is any type of user interface software, including a graphical user interface or a combination of a voice interface and a graphical user interface. User interface 112 may be used to create, view, edit, or process a digital document. Alternatively or in addition, user interface 112 may provide an application program interface (API) that allows executing programs or processes of the user system 110 to make documents available for processing by the management system 130 and/or DPS 140.

A digital document can be created by document generation software. The digital document may be edited by a user operating text editing software. The term user, as used herein, may refer to at least one human person interacting with a computing device, or may refer to an automated process. For instance, a bot, a personal digital assistant, or a robot may be a user, in some embodiments.

Management system 130 is bi-directionally communicatively coupled to user system 110 and DPS 140 by network 120. In an embodiment, management system 130 is a cloud-based procurement system. In other embodiments, management system 130 may be another type of transaction management system.

Management system 130 collects, stores, and manages transactional data related to transactions between entities and counterparty entities, such as procurement transactions between buyer entities and supplier entities or other related parties that have user accounts registered in the management system 130. Multiple instances of the management system 130 include, for example, different instances respectively operated by different entity and counterparty user accounts, such as buyer entity user accounts and supplier entity user accounts.

An instance of the management system 130 includes an instance that one of the entity user accounts operates. In an embodiment, the management system 130 includes portions of the COUPA SPEND MANAGEMENT software platform provided by Coupa Software of San Mateo, Calif.

In the embodiment of FIG. 1, management system 130 includes presentation layer 132, transaction data 134, and DPS interface 136.

Presentation layer 132 is embodied as computer programming code stored in computer memory that when executed causes a computing device to operate management system 130. Presentation layer 132 is in bidirectional digital communication with transaction data 134 and DPS interface 136 as needed to operate management system 130.

In an embodiment, presentation layer 132 is a server-side web application framework that generates portions of user interface 112 and through which management system 130 and transaction data 134 are made accessible to registered users of entities and counterparty entities.

Transaction data 134 is a data store that stores transaction data relating to transactions involving entities and counterparty entities. Transaction data 134 is implemented as a searchable database system, such as a graph-based database system or a table-based relational database system or a hierarchical database system. The stored transaction data 134 may include numerous data records, where each data record may indicate, for example, an entity name, a counterparty entity name, a transaction identifier and description, a transaction date, product information, cost information, invoice information, delivery information, and contract information.

DPS interface 136 is embodied as computer programming code stored in computer memory that when executed causes a computing device to enable bidirectional communication between management system 130 and DPS 140. For example, output produced by DPS 140 may be displayed by management system 130 or used to inform decisions made by management system 130, and output produced by management system 130 may be displayed by DPS 140 or used to inform decisions made by DPS 140, via DPS interface 136. DPS interface 136 may be implemented as, for example, a function call or library call using an application programming interface (API), or as an inter-process communication (IPC) interface. Thus, although not specifically shown, DPS 140 may be implemented within management system 130 rather than as a separate component.

Document processing system (DPS) 140 is a computer system that provides document processing functionality. In some embodiments, DPS 140 is a document management system, such as a contract lifecycle management system. In other embodiments, portions of DPS 140 may be incorporated as additional functions in text editing software. For instance, functionality of DPS 140 may be made available within a word processor by way of a "smart compare" widget.

In the embodiment of FIG. 1, DPS 140 includes presentation layer 142, document generation instructions 144, edit mapping instructions 146, significance prediction instructions 148, template data 150, structured data 152, domain logic 154, candidate edits 156, and document repository 158.

Presentation layer 142 is embodied as computer programming code stored in computer memory that when executed cause a computing device to operate DPS 140. Presentation layer 142 is in bidirectional digital communication with document generation instructions 144, edit mapping instructions 146, significance prediction instructions 148, template data 150, structured data 152, domain logic 154, and candidate edits 156 as needed to operate DPS 140.

Document generation instructions 144 is embodied as computer programming code stored in computer memory that when executed causes a computing device to automatically generate a digital document. In an embodiment, document generation instructions 144 is document generation software; that is, software that automatically generates documents such as electronic agreements.

Edit mapping instructions 146 is embodied as computer programming code stored in computer memory that when executed causes a computing device to map an edit to structured data, where the edit is a difference between unstructured text of an edited document and unstructured text of a reference document, the edit was detected by automated redline-style document comparison functionality of or accessed by DPS 140, the structured data was used by document generation instructions 144 to generate the reference document, and the edited document is a digital document, perhaps an edited version of the originally produced reference document, that has been "edited in the wild" by text editing software.

Unstructured text as used herein may refer to text that lacks metadata or otherwise cannot readily be indexed or mapped onto database fields or objects. Unstructured text may include but is not limited to natural language text such as the body of an email message, an instant message, the wording of a contractual document, text entered into a free-form field of an online form, an online article, a social media posting or thread of social media postings, or a comment or thread of comments on social media postings.

Structured data as used herein may refer to data values that are associated with pre-defined labels, such as metadata. Structured data may refer to the combination of one or more data values and a label. Examples of structured data include "Effective Date (Sep. 9, 1999)" and "Party (Acme, Inc.)" where the text outside the parentheses is the label, and the text within the parentheses is the data value. A data value may include any form of alphanumeric text, positive or negative integers, dates or timestamps, or real numbers, for example.

In some embodiments, structured data is labeled in a digital template as "conditional." An example of conditional text is state of residence, which is based on the country of residence. That is, the set of valid data values for state is determined based on the data value for country. "Los Angeles, Massachusetts" would be invalid, for example.

To identify an edit, edit mapping instructions 146 analyzes the output of redline-style text comparison functionality of or accessed by DPS 140. For example, edit mapping instructions 146 may measure a "delta" between a pair of text changes, such as a text insertion and a proximate text deletion or between a text deletion and a proximate text insertion. A delta indicates, for example, the number of characters that a text insertion and proximate text deletion have in common and/or the number of characters that the text insertion and proximate text deletion do not have in common.

"Proximate" as used herein may refer to a text change that is in close proximity to another text change in the edited document. Examples of proximate text changes include text changes that immediately precede or immediately follow other text changes and text changes that occur in the same sentence, clause, or paragraph of unstructured text.

If the delta satisfies a match criterion, edit mapping instructions 146 determines that the pair of text changes is an edit that is substantive and needs further analysis by DPS 140. If the delta does not satisfy the match criterion, edit mapping instructions 146 determines that the pair of text changes is not an edit that is substantive and does not need further analysis by DPS 140.

References to various different criterion herein may refer to a threshold value or threshold range of values to which data may be compared to determine whether a condition is met. In each case, the criterion is configured according to the requirements of a particular design or implementation of the system. Examples of criteria include "data value is less than or equal to x" and "data value is greater than x" and "data value is in the range of x to y," where x and y may be raw numerical values or computed values, such as percentiles or statistical or probabilistic confidence values.

In an embodiment, edit mapping instructions 146 maps edits to structured data using edit position data. In an embodiment, edit position data includes document section identifier data that is embedded in the edited document and is correlated with the position of the edit in the edited document. For example, edit position data may include a paragraph number of or proximate to the paragraph in which the edit occurs.

The edit position data associated with an edit in an edited document may or may not map to document section identifier data stored in a digital template associated with a reference document. If the edit position data associated with an edit in an edited document does not exactly match document section identifier data stored in a digital template for a reference document, this lack of a direct mapping may decrease the predicted significance of the edit. If the edit position data associated with an edit in an edited document matches document section identifier data stored in a digital template, the predicted significance of the edit may increase. Additional details of operations that may be performed by execution of edit mapping instructions 146 in order to map an edit to structured data are described below.

Significance prediction instructions 148 is embodied as computer programming code stored in computer memory that when executed causes a computing device to predict a significance of an edit that has been mapped to structured data by edit mapping instructions 146. In an embodiment, significance prediction instructions 148 determines significance by measuring similarity of an edit to mapped structured data using a pattern matching algorithm such as named entity recognition, and analyzing the mapped structured data.

For example, significance prediction instructions 148 may increase or decrease the predicted significance of a particular edit if the edit maps to a particular type of structured data or if the mapped structured data has logic associated with it by the digital template. Also or alternatively, significance prediction instructions 138 may increase or decrease the predicted significance of a particular edit depending on the degree to which the edit position data associated with the edit matches document section identifier data stored in the digital template. Additional details of operations that may be performed by execution of significance prediction instructions 148 to predict the significance of an edit are described below.

Template data 150 is a digital data store that stores template data. Template data includes digital templates that are used by document generation instructions 144 to automatically generate reference documents. In an embodiment, a digital template contains domain logic that represents every foreseeable permutation of possible conditional outputs. A digital template includes, for example, a document identifier, a number of document section identifiers, and for each document section identifier, a structured data identifier and/or one or more logic identifiers and/or one or more candidate edit identifiers. An example of a document identifier is a file name.

Examples of document section identifiers include paragraph identifiers, page identifiers, column identifiers, and sentence identifiers. Examples of structured data identifiers include data record identifiers that can be used to locate portions of structured data 152 that are associated with a particular document section identifier. Examples of logic identifiers include data record identifiers that can be used to locate portions of domain logic 154 that are associated with a particular document section identifier. Examples of candidate edit identifiers include data record identifiers that can be used to locate portions of candidate edits 156 that are associated with a particular document section identifier. An example of data that may be stored in a template is shown in Table 1 below.

TABLE 1

Example Template.
Document ID: Contract1.doc

| Section ID | Structured Data ID | Logic ID | Candidate Edits ID |
|---|---|---|---|
| 0001 | SD001 | none | none |
| 0002 | SD002 | L1002 | CE001 |
| 0003 | SD003 | L1003 | none |

In Table 1, a template is defined for a document called Contract1.doc. The document has multiple sections 0001, 0002, 0003, each of which maps to a corresponding set of structured data. As shown by Table 1, logic identifiers and candidate edits identifiers are not required for every document section. While not specifically shown in Table 1, a document may include one or more sections that does not map to any structured data. An example of a document section that might not map to any structured data is a "whereas" clause of a contract.

Structured data 152 is a digital data store that stores structured data that is used by document generation instructions 144 to automatically generate reference documents. For example, a data record stored in structured data 152 may contain all of the structured data used by document generation instructions to generate a particular reference document or a particular section of a reference document. A data record of structured data 152 may be keyed to a document identifier and/or a document section identifier, in a digital template.

Structured data 152 may include, for a particular item of structured data, a data type indicator that indicates a particular type, category or class to which the item of structured data belongs. For example, a particular item of structured data may have a data type of "variable" or "conditional."

Structured data 152 can be domain-specific. For example, in a contract lifecycle management system, structured data 152 may include contract terms, such as the party names, effective date, product name, contract type, price, and jurisdiction. In other embodiments, candidate edits can include rules for handling edits to particular document sections, such as rules for handling edits to the title, abstract, or conclusion of a document.

Portions of structured data 152 may be obtained by a front-end system interacting with a computer user. For instance, portions of structured data 152 may be collected through an automated question and answer process executed by "wizard" software, in which a user is prompted to input responses to each of a pre-determined set of questions.

TABLE 2

Examples of Structured Data.

| Structured Data ID | Name | Data Type | Data Value |
| --- | --- | --- | --- |
| SD001 | Counterparty Name | Variable | Acme, Inc. |
| SD002 | Liability Cap | Conditional Variable | Yes/No $1,000,000.00 |
| SD003 | Jurisdiction | Conditional | California |

Table 2 illustrates variable and conditional types of structured data. Variable and conditional data types may trigger the execution of domain logic. For example, a variable data type may indicate that the data value can be changed, but a change must be validated. A conditional data type may indicate that the data value can be changed, but changing the data value triggers one or more other changes that need to be made to the document. Other data types not shown in Table 1 may not trigger any domain logic. Thus, an edit to unstructured text that maps to structured data may trigger the execution of domain logic or may not trigger the execution of any domain logic, depending on the data type of the structured data.

In Table 2, the example SD002 (Liability Cap) illustrates structured data that has both a conditional instance (valid values Yes or No), and a variable instance (a maximum valid dollar value). In some embodiments, the system treats every input item as a variable and there can be any amount of downstream conditional logic that is driven from that variable.

Domain logic 154 is a digital data store that stores domain logic, or parameters that are used by domain logic that is implemented in executable code of or called by significance prediction instructions 148. Examples of domain logic 154 include rules and heuristics. An item of domain logic 154 is identified by a logic identifier. An item of domain logic 154 may be keyed to a document identifier and/or a document section identifier, in a digital template.

Domain logic 154 can be domain-specific. For example, in a contract lifecycle management system, domain logic 154 may include rules for handling edits to particular contract terms or clauses. In other embodiments, domain logic 154 can include rules for handling edits to particular document sections, such as rules for handling edits to the title, abstract, or conclusion of a document.

TABLE 3

Examples of Domain Logic.

| Logic ID | Rule |
| --- | --- |
| L1002 | Insert insurance provision if liability cap amount exceeds $500,000. |
| L1003 | Prompt user to validate edit and insert jurisdiction-specific provisions if edit is validated. |
| L1004 | Prompt user to validate edit and insert edit into structured data if edit is validated. |

Table 3 illustrates examples of domain logic that may be associated with structured data. As shown in Table 3, domain logic can include generating a prompt for additional user input and/or automatic insertion of additional or different text into the document.

Candidate edits 156 is a digital data store that stores candidate edits that may be incorporated into a reference document as a result of execution of domain logic. Examples of candidate edits 156 include new text and alternative text. An item of candidate edits 156 is identified by a candidate edit identifier. An item of candidate edits 156 may be keyed to a document identifier and/or a document section identifier, in a digital template.

Candidate edits 156 can be domain-specific. For example, in a contract lifecycle management system, candidate edits 156 may include alternative clauses or fallback language that may be inserted into a contract. In other embodiments, candidate edits can include alternative salutations, responses, or closing remarks, for example.

Document repository 158 is a digital data store that stores reference documents and edited documents. Document repository 158 can store different versions of documents that are generated by document generation software and documents that have been edited by text editing software.

A client portion of management system 130 and/or DPS 140 may operate in user system 110, for example as a plugin or widget in a graphical user interface of a software application or as a web browser executing user interface 112. In an embodiment, a web browser may transmit a HTTP request over a network (e.g., the Internet) in response to user input (e.g., entering of a text sequence) that is received through a user interface provided by the web application and displayed through the web browser. A server portion of management system 130 and/or DPS 140 may receive the input, perform at least one operation to analyze the input, and return at least one modified version of the input using an HTTP response that the web browser receives and processes.

Each of user system 110, management system 130, and DPS 140 is implemented using at least one computing device that is communicatively coupled to electronic communications network 120. User system 110 is configured to communicate bidirectionally with at least management system 130, for example over network 120. Management system 130 is configured to communicate bidirectionally with at least user system 110 and DPS 140, for example over network 120. Examples of communicative coupling mechanisms include inter-process communication (IPC) interfaces and application program interfaces (APIs).

The features of user system 110, management system 130, and DPS 140 are implemented using computer software, hardware, or software and hardware, and may include combinations of automated functionality, data structures, and digital data, which are represented schematically in FIG. 1. User system 110, management system 130, and DPS 140 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

The term data store as used herein may refer to any implementation of a searchable data store, including but not limited to databases, graphs, trees, and XML (eXtensible Markup Language) files. Stored data of management system 130 and/or DPS 140 may reside on at least one persistent and/or volatile storage devices that may reside within the same local network as at least one other device of computing system 100 and/or in a network that is remote relative to at least one other device of computing system 100. Thus, although depicted as being included in computing system 100, stored data of management system 130 and/or DPS 140 may be part of computing system 100 or accessed by computing system 100 over a network, such as network 120.

Logical connection as used in this disclosure may refer to a flow of digital information or data communication that is established between two devices on a network by network software communicating with, for example, the devices' operating systems either directly or by a virtual machine. Examples of protocols that may be used to establish a logical connection include hypertext transfer protocol (HTTP) and secure sockets layer (SSL).

Network 120 may be implemented on any medium or mechanism that provides for the exchange of data, signals, and/or instructions between sub-systems 110, 130, 140 of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Example Document Processing System

Figure 1B:
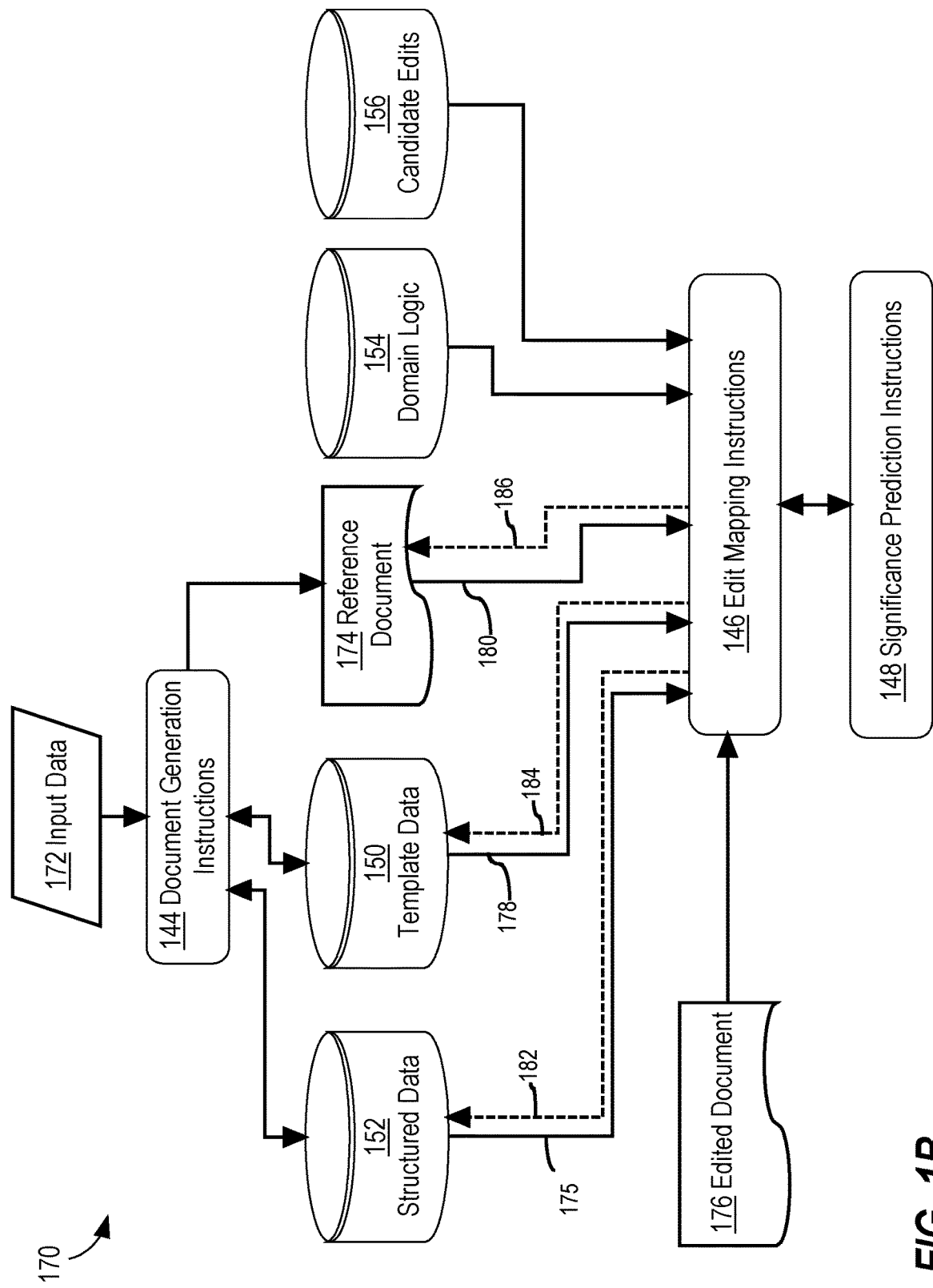
FIG. 1B is a flow diagram of a process that may be executed by at least one device of the computing system of FIG. 1.

FIG. 1B is a simplified flow diagram of an embodiment of operations that can be performed by at least one device of a computing system. The operations of a flow 170 as shown in FIG. 1B can be implemented using processor-executable instructions that are stored in computer memory. For purposes of providing a clear example, the operations of FIG. 1B are described as performed by computing system 100, but other embodiments may use other systems, devices, or implemented techniques.

In flow 170, input data 172 is ingested by document generation instructions 144. In an embodiment, input data 172 includes answers obtained from a user to questions posed by a "wizard," or another type of question and answer format, or through a data entry form.

Document generation instructions 144 processes input data 172 and creates an instance of each of structured data 152 and template data 150, and a reference document 174, all corresponding to the input data 172. Examples of approaches that may be used to implement document generation instructions 144 are described in Wodetzki et al., U. S. Patent Application Publication 2018/0268506, which is incorporated herein by this reference.

Each or either of domain logic 154 and candidate edits 156 may be pre-configured and stored independently of input data 172. For example, each or either of domain logic 154 and candidate edits may contain a set of rules that applies to all documents of a particular type; for example, all procurement contracts for a particular supplier entity.

When an edited document 176 is ingested, edit mapping instructions 146 generate a redline-style comparison that visually illustrates edits; that is, the differences between the unstructured text of edited document 176 and reference document 174. Edit mapping instructions 146 also uses template data 150 to map the identified edits to corresponding structured data 152. To do this, edit mapping instructions 146 identifies, using metadata embedded in edited document 176, a document identifier associated with edited document 176 and a document section identifier associated with the identified edit and searches template data 150 for matching document identifier data and matching document section identifier data.

If edit mapping instructions 146 finds a matching document section identifier in the template data 150 for edited document 176, edit mapping instructions 146 calls significance prediction instructions 148. Significance prediction instructions 148 compares the identified edit to structured data associated with the portion of the template data 150 that maps to the document section identifier associated with the edit. To do this, significance prediction instructions 148 executes a pattern matching algorithm to measure the similarity between the edit and the structured data.

Significance prediction instructions 149 uses the measured similarity to predict the significance of the edit. For example, if the measured similarity satisfies a similarity criterion, significance prediction instructions 148 may output a "high significance" indicator. If the measured similarity does not satisfy the similarity criterion, significance prediction instructions 148 may output a "low significance" indicator.

Depending on the output produced by significance prediction instructions 148, edit mapping instructions 146 may cause execution of domain logic 154 associated with the structured data 152 in the portion of the template data 150 that maps to the document section identifier associated with the edit. Execution of domain logic 154 may cause presentation of a prompt and/or one or more candidate edits 156 to the user. Depending on the domain logic 154 executed and/or the user's responses obtained by execution of domain logic 154, each or any of structured data 152, template data 150, and reference document 174 may be modified or updated as illustrated by arrows 175, 182; 178, 184, 180, 186, in which the dashed-line arrows 182, 184, 186 indicate that updates are optional or dependent upon upstream system processes. Edit mapping instructions 146 and significance prediction instructions 148 repeat the above-described actions for other edits that are identified by the redline-style comparison of edited document 176 to reference document 174.

Example Edit Mapping Process

Figure 2:
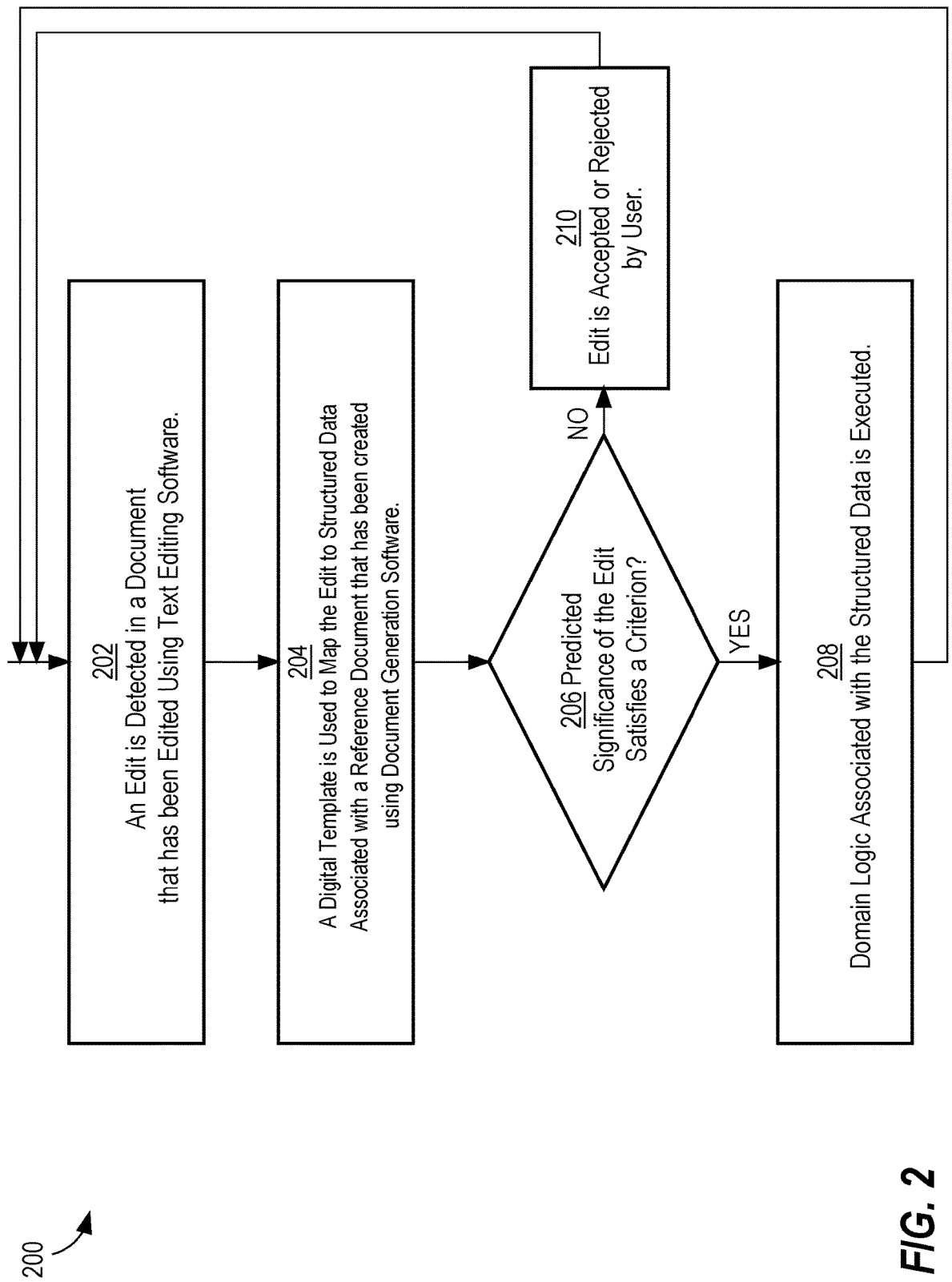
FIG. 2 is a flow diagram of a process that may be executed by at least one device of the computing system of FIG. 1.

FIG. 2 is a simplified flow diagram of an embodiment of operations that can be performed by at least one device of a computing system. The operations of a flow 200 as shown in FIG. 2 can be implemented using processor-executable instructions that are stored in computer memory. For purposes of providing a clear example, the operations of FIG. 2 are described as performed by computing system 100, but other embodiments may use other systems, devices, or implemented techniques.

Operation 202 when executed by at least one processor causes one or more computing devices to detect an edit in a document that has been edited using text editing software. To do this, operation 202 executes a redline-style comparison of unstructured text of the edited document to unstructured text of a reference document.

Operation 204 when executed by at least one processor causes one or more computing devices to use a digital template to map the edit detected in operation 202 to structured data associated with the reference document, where the reference document and its associated structured data have been created using document generation software. To do this, operation 204 may use the approaches described above as being executable by edit mapping instructions 146 or another suitable approach. For example, operation 204 may extract document identifier data and document section identifier data from the edited document and search a stored template associated with the document identifier data for matching document section identifier data.

Operation 206 when executed by at least one processor causes one or more computing devices to generate a predicted significance of the edit detected in operation 202 and determine if the predicted significance does or does not satisfy a significance criterion. To generate the predicted significance, operation 206 may use the approaches described above as being executable by significance prediction instructions 148 or another suitable approach. Operation 206 may be skipped if operation 204 is not able to map the edit to any structured data associated with the reference document. If operation 206 is skipped, or if the predicted significance does not satisfy the significance criterion, flow 200 may proceed to operation 210. If the predicted significance satisfies the significance criterion, flow 200 proceeds to operation 208.

Operation 208 when executed by at least one processor causes one or more computing devices to execute domain logic associated with the structured data that has been mapped to the edit by operation 204. In some embodiments, operation 208 executes a portion of domain logic 154 that has been associated with structured data in a template stored in template data 150.

Operation 210 when executed by at least one processor causes one or more computing devices to accept or reject the edit detected in operation 202. Operation 210 may be implemented using existing document redline/compare functionality of or accessed by DPS 140, which incorporates the edit into the unstructured text of the reference document without affecting the structured data associated with the reference document.

Flow 200 may be repeated if the edited document contains other edits. As such, flow 200 may return to operation 202 following operation 208 or operation 210.

Example User Interface Flow

Figure 3:
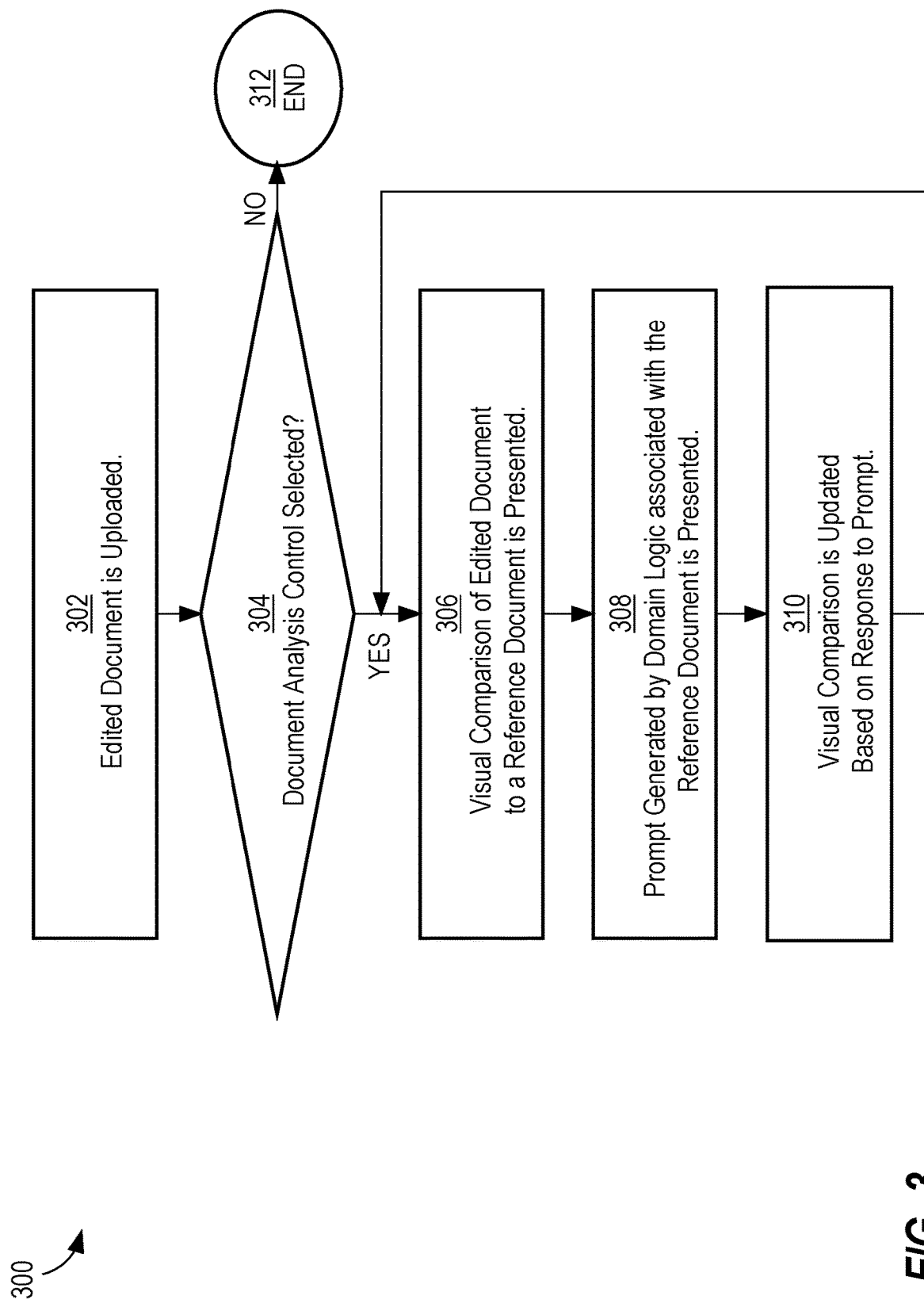
FIG. 3 is a flow diagram of a process that may be executed by at least one device of the computing system of FIG. 1.

FIG. 3 is a simplified flow diagram of an embodiment of operations that can be performed by at least one device of a computing system. The operations of a flow 300 as shown in FIG. 3 can be implemented using processor-executable instructions that are stored in computer memory. For purposes of providing a clear example, the operations of FIG. 3 are described as performed by computing system 100, but other embodiments may use other systems or implemented techniques.

Flow 300 includes operations that involve elements of a graphical user interface (GUI). The graphical user interface code may be created by a GUI builder software tool and/or a programming language such as JAVA, for example. In operation, executable code is processed by a display device to render the elements of the GUI on a display screen.

Examples of graphical user interface displays that may be included in flow 300 are shown in FIG. 4A, FIG. 4B, FIG. 4C, and FIG. 4D, described below.

Operation 302 when executed by at least one processor causes one or more computing devices to upload an edited document. Operation 302 may be triggered by a selection of an upload control in a graphical user interface. In an embodiment, operation 302 creates a copy of the edited document and stores the copy of the edited document in document repository 158. The edited document may be, for example, a subsequent version of a reference document. Unstructured text of the edited document may have been edited using text editing software. The edited document may have been received from another computing device by an electronic file sharing or file transmission mechanism.

Operation 304 when executed by at least one processor causes one or more computing devices to determine whether a document analysis control of the graphical user interface has been selected. As used herein, selection may refer to a signal generated as a result of an electronic interaction between an input device and the graphical user interface. For example, a selection may be generated by a keyboard, keypad, mouse or stylus.

If the document analysis control has not been selected, flow 300 proceeds to operation 312 and ends. If operation 304 determines that the document analysis control has been selected, flow 300 proceeds to operation 306.

Operation 306 when executed by at least one processor causes one or more computing devices to present, in the graphical user interface, a visual comparison of an edited document to a reference document. The visual comparison produced by operation 306 highlights differences between unstructured text of the edited document and unstructured text of the reference document. In an embodiment, operation 306 generates and presents a redline-style comparison of the edited document to the reference document.

Operation 308 when executed by at least one processor causes one or more computing devices to present, on the graphical user interface, a prompt that has been generated by domain logic associated with the reference document. Examples of prompts that may be presented on the graphical user interface as a result of operation 306 include prompts to validate edits, prompts to inform users of the significance of particular edits, prompts to update structured data as a result of particular edits, and prompts to select candidate edits for insertion into the reference document.

Operation 310 when executed by at least one processor causes one or more computing devices to update the visual comparison presented in the graphical user interface by operation 306, based on data received in response the prompt generated by operation 308.

Portions of flow 300 may be repeated if the edited document contains other edits. As such, flow 300 may return to operation 306 following operation 310.

Implementation Example—Graphical User Interface

FIG. 4A, FIG. 4B, FIG. 4C, and FIG. 4D are example screen captures of displays on computer display devices that may be implemented in at least one embodiment of the computing system of FIG. 1. In particular, FIG. 4A, FIG. 4B, FIG. 4C, and FIG. 4D illustrate an example of a sequence of progressively displayed user interface screens.

Figure 4A:
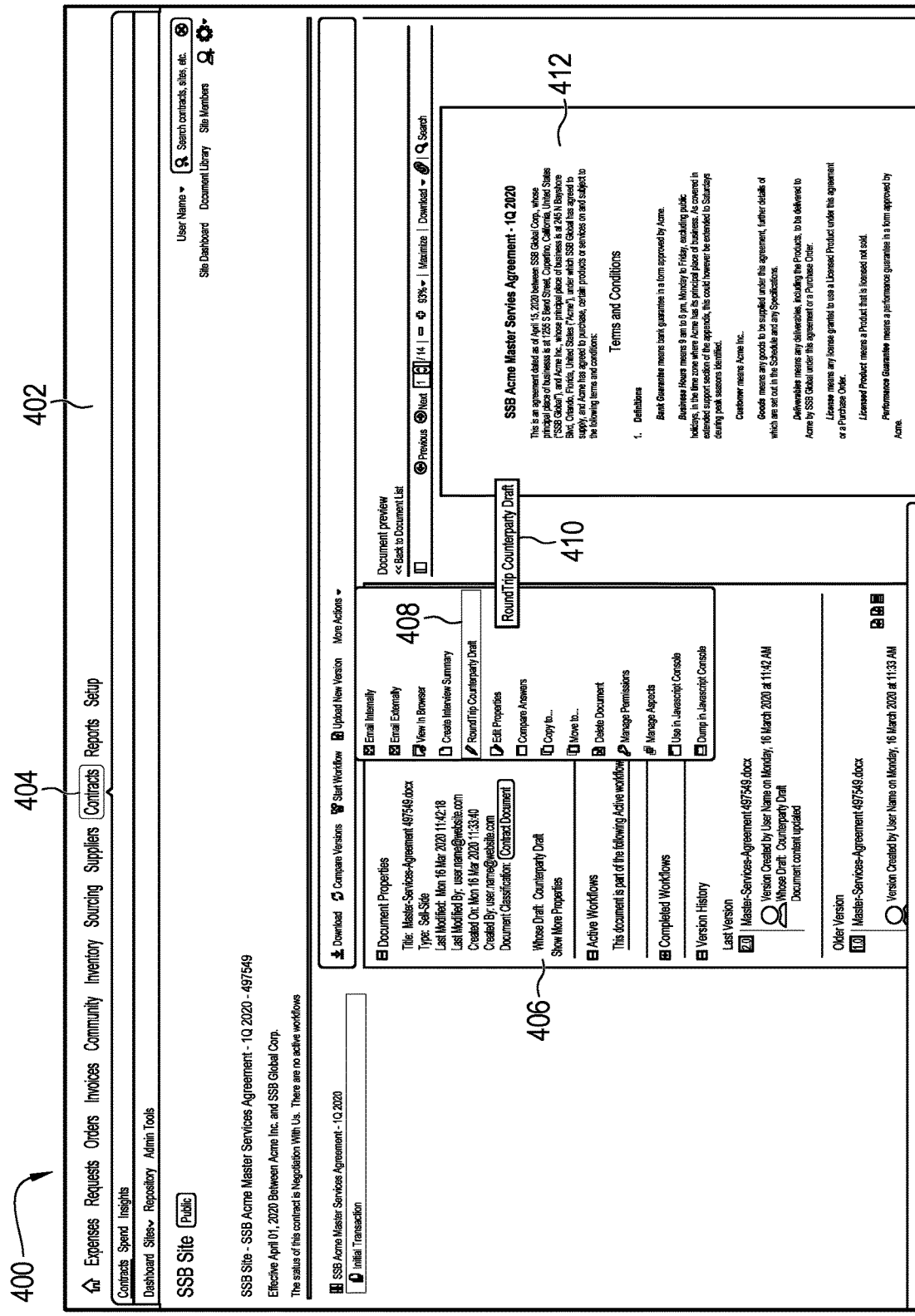

FIG. 4A is a screen capture of an example of a display that may be implemented in an embodiment of the computing system of FIG. 1. In particular, FIG. 4A illustrates an example of a screen 400 of a management system, such as management system 130, with a menu bar 402 and a Contracts menu item 404 having been selected.

As a result of selection of contracts menu item 404, screen 400 displays document properties data. The document properties data includes an indication 406 that a document 412, shown in document preview window, is a counterparty draft of a reference document. Document 412 is an edited document that has been received, perhaps from the wild, and uploaded to the management system. Graphical element 410 indicates to the user that menu item 408, roundtrip counterparty draft, has been selected. In response to selection of menu item 408, the progression of user interface displays continues to FIG. 4B.

Figure 4B:
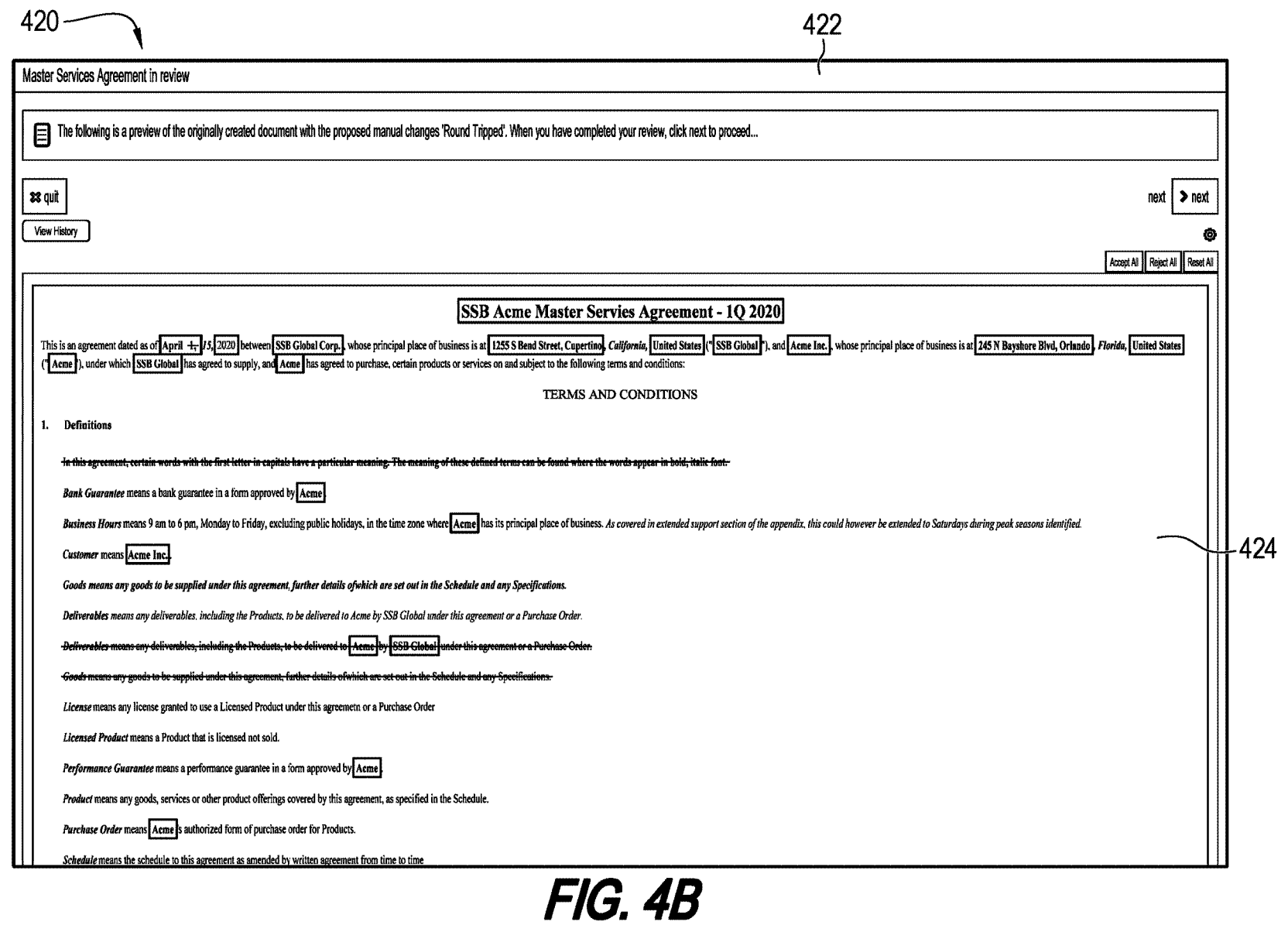

FIG. 4B shows an example of a screen 420 that may be presented in response to selection of menu item 408 of FIG. 4A. Screen 420 includes a document review window 422. A redline-style comparison 424 is presented in review window 422. Comparison 424 highlights text-based differences between unstructured text of document 412 and unstructured text of the reference document.

Comparison 424 uses edit signals to indicate differences between document 412 and the reference document. For example, comparison 424 shows text deletions in strikethrough and text insertions in underline, where the deletions and insertions are relative to the reference document. Comparison 424 also highlights elements of structured data associated with the reference document; here, using bounding boxes. Thus, a section of comparison 424 that includes both an edit signal and a bounding box indicates that document 412 may contain an edit that may require the structured data associated with the reference document to be updated.

Figure 4C:
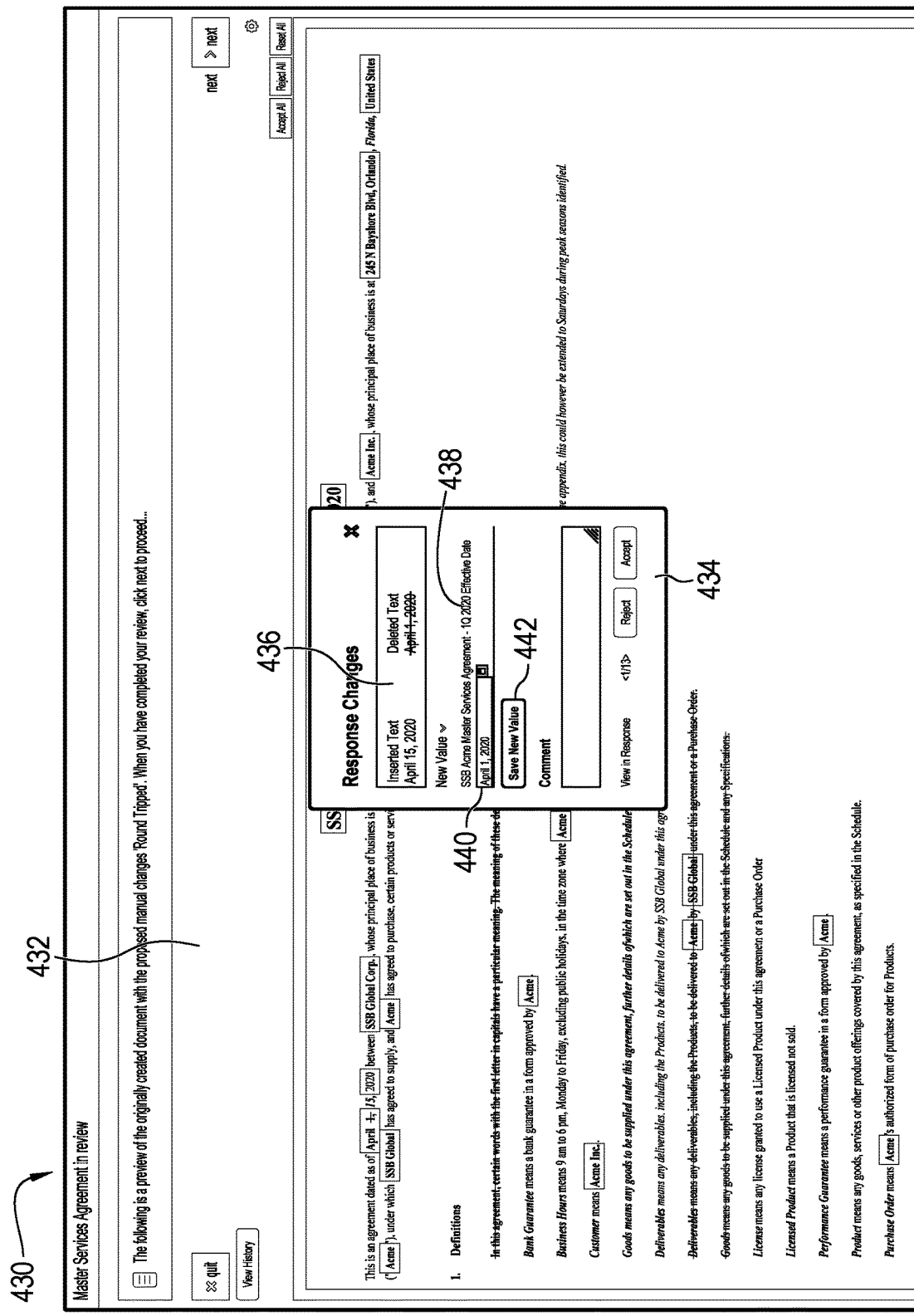

In FIG. 4C, screen 430 shows an example of a document review window 432. Window 432 is a progression of window 422 of FIG. 4B, which is associated with the visual comparison. For example, window 432 includes an overlay window 434. Overlay window 434 overlays at least a portion of the visual comparison of document 412 to the reference document. Window 434 includes a notification 436, a document identifier 438, an input box 440, and a control 442. In other embodiments, window 432 may be positioned adjacent to the visual comparison or on another part of screen 430, without overlaying the visual comparison.

The display of overlay window 434 results from the execution of domain logic that is triggered by the text change indicated by notification 436. The delta between the inserted text and the deleted text is a difference in the date value. Because the delta changes the date value, the text change maps to structured data associated by a stored template with the reference document, for example, an Effective Date, and the data type of the structured data is "variable," for instance, the system has determined that the text change has a high predicted significance. As a result, domain logic is executed to prompt the user to validate the text change before it is accepted or to reject the change.

Input box 440 prompts the user to accept the new date value or input a different value or verify that the data value is of the expected format. Control 442 when selected updates the visual comparison and also stores the data value entered in input box 440 as structured data, for example in structured data 152. In this way, control 442 acts as an interface between the edited document 412, the reference document, and structured data associated with the reference document. Control 442 ensures that the structured data associated with the reference document is updated to reflect the data value entered in input box 440. Control 442 also ensures that the entered value is consistent in all places where that value occurs in the document. A name change, for example, will be updated automatically in every place that value (structured data) is used in the document. This ability to ensure automatic and consistent updating of structured data throughout a document is difficult to implement in a traditional text editor/word processor.

Figure 4D:
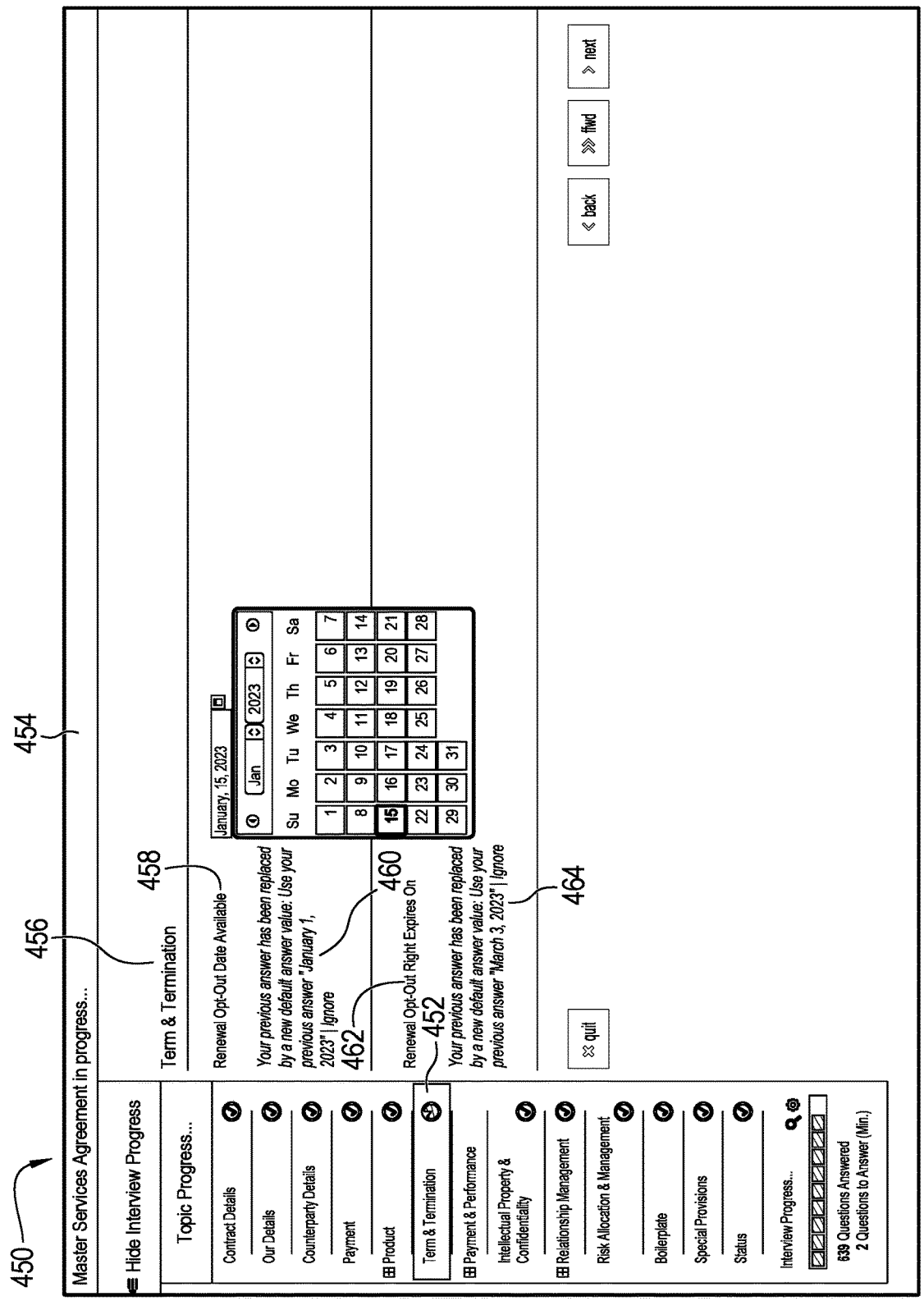

In FIG. 4D, screen 450 shows an example of a document review window 454 associated with a review of a particular document section 452. Window 454 is another window in a progression of windows that may include windows 422 and 434. Window 454 includes an overlay window 454. Overlay window 454 overlays the visual comparison of document 412 to the reference document, in an embodiment. Window 454 includes a document section identifier 456, structured data identifiers 458 and 462, and edits 460 and 464.

Window 454 notifies the user that an edit to structured data 458, Renewal Opt-Out Date Available, has been detected and prompts the user to validate the edit, ignore the edit, or enter a new value. In addition, window 454 notifies the user that structured data 462 is affected by the edit to structured data 458 and prompts the user to validate the edit, ignore the edit, or enter a new value for structured data 462. Thus, window 454 illustrates a situation in which an edit maps to structured data that has a data type of "conditional."

The display of overlay window 454 results from the execution of domain logic that is triggered by the text change indicated by notification text associated with structured data identifier 458. Because the edit substantively changes structured data and the structured data is conditional, the text change has a high predicted significance. As a result, domain logic is executed to prompt the user to validate each of the text changes that affect structured data before those changes are accepted or to reject those changes. Other examples of domain logic include conditioning the changing of one date on a change to another date; for instance, the end date of a contract term may be automatically updated based on a change to the duration of the contract term and/or the contract start date.

A graphical control, such as a "next" button, when selected updates the visual comparison and also stores the changed data values as structured data, for example in structured data 152. In this way, window 454 acts as an interface between the edited document 412, the reference document, and structured data associated with the reference document. Window 454 ensures that the structured data 458, 462 associated with the reference document are updated to reflect the data values entered or validated by window 454.

Implementation Example—Hardware Overview

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 5:
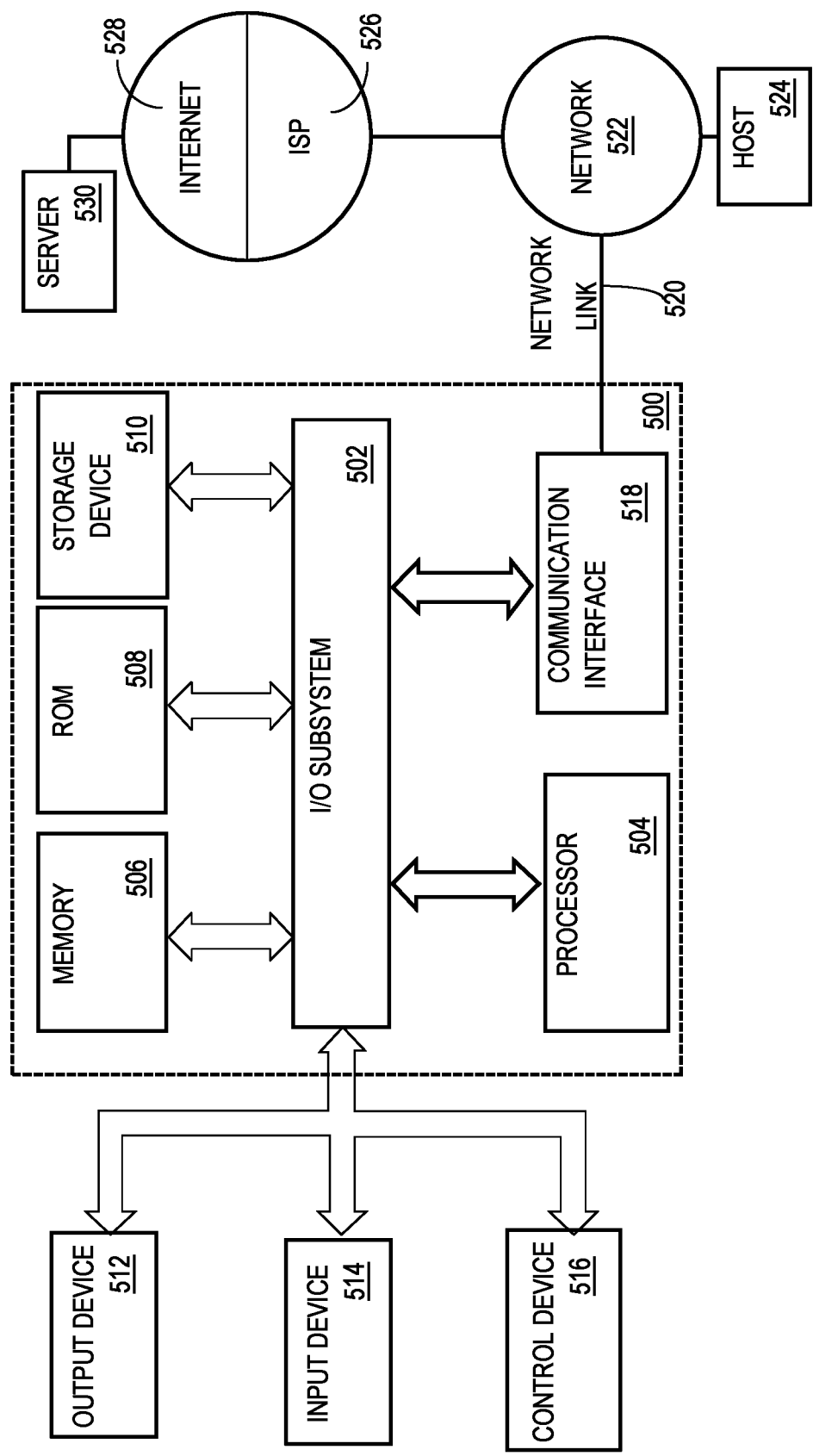
FIG. 5 is a block diagram illustrating an embodiment of a hardware system, which may be used to implement various aspects of the computing system of FIG. 1.

For example, FIG. 5 is a block diagram that illustrates a computer system 500 upon which an embodiment of the present invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 and further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, at least one ASIC or FPGA, firmware and/or program logic which in combination with the computer system causes or programs computer system 500 to be a special-purpose machine. According to one embodiment, the techniques herein are performed by computer system 500 in response to processor 504 executing at least one sequence of instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying at least one sequence of instruction to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated-services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through at least one network to other data devices. For example, network link 520 may provide a connection through local network 522 to a host computer 524 or to data equipment operated by an Internet Service Provider (ISP) 526. ISP 526 in turn provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

ADDITIONAL EXAMPLES

Illustrative examples of the technologies disclosed herein are provided below. An embodiment of the technologies may include any of the examples or a combination of the described below.

In an example 1, a method includes: causing rendering, by a graphical user interface (GUI), a document upload control; in response to a selection of the document upload control, causing rendering, by the GUI, a preview window that displays a view of an edited document; causing rendering, by the GUI, of a document analysis control; in response to a selection of the document analysis control, detecting an edit in the edited document, the edit being a difference between unstructured text of the edited document and unstructured text of a reference document, the edit having been made in the edited document by text editing software, the reference document having been automatically created from stored structured data referenced by a stored template; causing rendering, by the GUI, of a visual comparison of the edited document to the reference document; using the stored template, mapping the edit to stored structured data; executing stored logic that the stored template has associated with the stored structured data; causing rendering, by the GUI, in a window associated with the visual comparison, a prompt to at least one of alter the stored template or alter the stored structured data or insert a candidate edit from a stored set of candidate edits into the reference document.

An example 2 includes the subject matter of example 1, and further includes determining edit position data indicating a position of the edit in the edited document and mapping the edit position data to position data in the stored template. An example 3 includes the subject matter of example 2, and further includes predicting a significance of the edit by comparing the edit position data to the position data in the stored template mapped to the edit position data. An example 4 includes the subject matter of any of examples 1-3, and further includes automatically predicting a significance of the edit by executing a pattern matching algorithm to compare the edit to the stored structured data mapped to the edit. An example 5 includes the subject matter of example 4, and further includes, when the stored structured data is conditional, using the predicted significance of the edit and a data value included in the edit to determine the stored logic to execute in response to the edit. An example 6 includes the subject matter of example 4, and further includes, when the stored structured data is variable, using the predicted significance of the edit and a data value included in the edit to alter the stored structured data. An example 7 includes the subject matter of any of examples 1-6, further including the method being executed using a contract lifecycle management computer system or a procurement computer system.

In an example 8, a method includes: detecting an edit in an edited document, the edit being a difference between unstructured text of the edited document and structured or unstructured text of a reference document, the edit having been made in the edited document by text editing software, the reference document having been automatically created by document generation software from stored structured data referenced by a stored template; using the stored template, mapping the edit to stored structured data; executing stored logic that the stored template has associated with the stored structured data to at least one of alter the stored template or alter the stored structured data or insert a candidate edit from a stored set of candidate edits into the reference document.

An example 9 includes the subject matter of example 8, and further includes determining edit position data indicative of a position of the edit in the edited document and mapping the edit position data to document section identifier data in the stored template. An example 10 includes the subject matter of example 9, and further includes predicting a significance of the edit by comparing the edit position data to the document section identifier data in the stored template. An example 11 includes the subject matter of any of examples 8-10, and further includes predicting a significance of the edit by executing a pattern matching algorithm to compare the edit to the stored structured data mapped to the edit. An example 12 includes the subject matter of example 11, and further includes, when the stored structured data is conditional, using the predicted significance of the edit and the edit to determine the stored logic to execute in response to the edit. An example 13 includes the subject matter of example 11, and further includes, when the stored structured data is variable, using the predicted significance of the edit and the edit to alter the stored structured data.

In an example 14, a method includes: causing rendering, by a graphical user interface (GUI), a document upload control; in response to a selection of the document upload control, causing rendering, by the GUI, a preview window that displays a view of an edited document; causing rendering, by the GUI, of a document analysis control; in response to a selection of the document analysis control, causing rendering, by the GUI, of a visual comparison of the edited document to a reference document, the visual comparison indicating an edit, the edit being a difference between unstructured text of the edited document and unstructured text of the reference document, the edit having been made in the edited document by text editing software, the reference document automatically created by document generation software from stored structured data referenced by a stored template; causing rendering, by the GUI, in a window associated with the visual comparison, a prompt to at least one of alter the stored template or alter the stored structured data or insert a candidate edit from a stored set of candidate edits into the reference document.

An example 15 includes the subject matter of example 14, and further includes determining edit position data indicative of a position of the edit in the edited document and mapping the edit position data to document section identifier data in the stored template. An example 16 includes the subject matter of example 15, and further includes predicting a significance of the edit by comparing the edit position data to the document section identifier data in the stored template. An example 17 includes the subject matter of any of examples 14-16, and further includes predicting a significance of the edit by executing a pattern matching algorithm to compare the edit to the stored structured data mapped to the edit. An example 18 includes the subject matter of example 17, and further includes, when the stored structured data is conditional, using the predicted significance of the edit and the edit to determine stored logic to execute in response to the edit. An example 19 includes the subject matter of example 17, and further includes, when the stored structured data is variable, using the predicted significance of the edit and the edit to alter the stored structured data. An example 20 includes the subject matter of any of examples 14-18, further including the method being performed by a contract lifecycle management system or a procurement system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A method comprising: causing rendering, by a graphical user interface (GUI), a document upload control;
in response to a selection of the document upload control, causing rendering, by the GUI, a preview window that displays a view of an edited document;
causing rendering, by the GUI, of a document analysis control;
in response to a selection of the document analysis control, detecting an edit in the edited document, the edit being a difference between unstructured text of the edited document and unstructured text of a reference document, the edit having been made in the edited document by text editing software, the reference document having been automatically created from stored structured data referenced by a stored template;
determining edit position data indicating a position of the edit in the edited document and mapping the edit position data to position data in the stored template;
predicting a significance of the edit by comparing the edit position data to the position data in the stored template mapped to the edit position data;
causing rendering, by the GUI, of a visual comparison of the edited document to the reference document;
using the stored template, mapping the edit to stored structured data;
executing stored logic that the stored template has associated with the stored structured data in response to the predicted significance of the edit;
causing rendering, by the GUI, in response to the executed logic, in a window associated with the visual comparison, a prompt to at least one of alter the stored template or alter the stored structure data or insert a candidate edit from a stored set of candidate edits into the reference document.

2. The method of claim 1, further comprising automatically predicting the significance of the edit by executing a pattern matching algorithm to compare the edit to stored structured data mapped to the edit.

3. The method of claim 2, further comprising, when the stored structured data is conditional, using the predicted significance of the edit and a data value included in the edit to determine the stored logic to execute in response to the edit.

4. The method of claim 2, further comprising, when the stored structured data is variable, using the predicted significance of the edit and a data value included in the edit to alter the stored structured data.

5. The method of claim 1, further comprising the method being executed using a contract lifecycle management computer system or a procurement computer system.

6. A Method comprising:
detecting an edit in an edited document, the edit being a difference between unstructured text of the edited document and structured or unstructured text of a reference document, the edit having been made in the edited document by text editing software, the reference document having been automatically created by document generation software from stored structured data referenced by a stored template;
determining edit position data indicative of a position of the edit in the edited document and mapping the edit position data to document section identifier data in the stored template;
predicting a significance of the edit by comparing the edit position data to the document section identifier data in the stored template;
using the stored template, mapping the edit to stored structured data;
executing stored logic that the stored template has associated with the stored structured data, in response to the predicted significance of the edit, to at least one of alter the stored template or alter the stored structured data or insert a candidate edit from a stored set of candidate edits into the reference document.

7. The method of claim 6, further comprising predicting the significance of the edit by executing a pattern matching algorithm to compare the edit to the stored structured data mapped to the edit.

8. The method of claim 7, further comprising, when the stored structured data is conditional, using the predicted significance of the edit and the edit to determine the stored logic to execute in response to the edit.

9. The method of claim 7, further comprising, when the stored structured data is variable, using the predicted significance of the edit and the edit to alter stored structured data.

10. A Method comprising:
causing rendering, by a graphical user interface (GUI), a document upload control;
in response to a selection of the document upload control, causing rendering, by the GUI, a preview window that displays a view of an edited document;
causing rendering, by the GUI, of a document analysis control;
determining edit position data indicative of a position of an edit in the edited document and mapping the edit position data to document section identifier data in a stored template;
predicting a significance of the edit by comparing the edit position data to the document section identifier data in the stored template;
in response to a selection of the document analysis control, causing rendering, by the GUI, of a visual comparison of the edited document to a reference document, the visual comparison indicating the edit, the edit being a difference between unstructured text of the edited document and unstructured text of the reference document, the edit having been made in the edited document by text editing software, the reference document automatically created by document generation software from stored structured data referenced by the stored template;
causing rendering, by the GUI, in response to the predicted significance of the edit, in a window associated with the visual comparison, a prompt to at least one of alter the stored template or alter the stored structured data or insert a candidate edit from a stored set of candidate edits into the reference document.

11. The method of claim 10, further comprising predicting the significance of the edit by executing a pattern matching algorithm to compare the edit to the stored structured data mapped to the edit.

12. The method of claim 11, further comprising, when the stored structured data is conditional, using the predicted significance of the edit and the edit to determine stored logic to execute in response to the edit.

13. The method of claim 11, further comprising, when the stored structured data is variable, using the predicted significance of the edit and the edit to alter the stored structured data.

14. The method of claim 10, further comprising the method being performed by a contract lifecycle management system or a procurement system.

* * * * *